United States Patent [19]

Rucks et al.

[11] Patent Number: 5,730,262
[45] Date of Patent: Mar. 24, 1998

[54] SHOCK ABSORBER OR VIBRATION DAMPER AND A HINGE EYE FOR A VIBRATION DAMPER OR SHOCK ABSORBER

[75] Inventors: Sabine Rucks, Schweinfurt; Gunther Braun, Geldersheim; Heinz Sydekum, Dittelbrunn, all of Germany

[73] Assignee: Fichtel & Sachs AG, Schweinfurt, Germany

[21] Appl. No.: 594,659

[22] Filed: Feb. 2, 1996

[30] Foreign Application Priority Data

Feb. 3, 1995 [DE] Germany .................. 195 03 499.6

[51] Int. Cl.[6] ................................................. F16F 9/00
[52] U.S. Cl. ........................................ 188/321.11; 403/269
[58] Field of Search ................................. 188/313, 316, 188/318, 317, 321.11; 403/265, 269

[56] References Cited

U.S. PATENT DOCUMENTS

| 2,484,485 | 10/1949 | Bricjman | 403/269 |
| 3,343,833 | 9/1967 | Fader . | |
| 4,268,018 | 5/1981 | Langanke | 188/321.11 X |
| 4,438,908 | 3/1984 | Terada | 188/321.11 X |
| 5,222,580 | 6/1993 | Wang | 188/321.11 |

FOREIGN PATENT DOCUMENTS 2137728  10/1984  United Kingdom .

*Primary Examiner*—Lee W. Young
*Attorney, Agent, or Firm*—Nils H. Ljungman and Associates

[57] ABSTRACT

Hinge eye, in particular for a vibration damper, comprising a plastic body with a transverse opening for a fastening means, and a connection opening for the unit to be retained, characterized by the fact that the connection opening has a metal reinforcement sleeve to reinforce the connection.

10 Claims, 5 Drawing Sheets

FIG. 3a
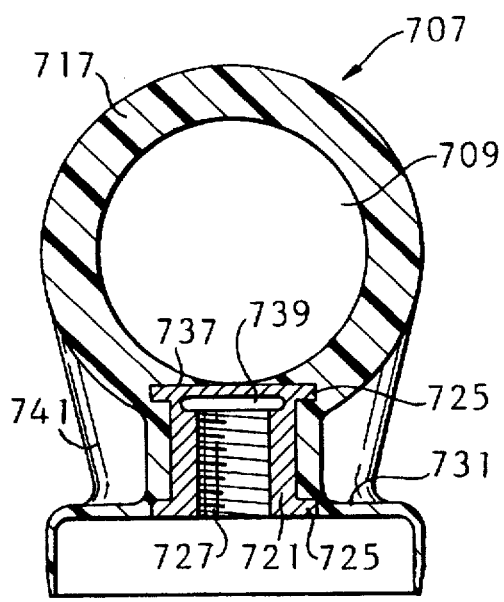
FIG. 3b
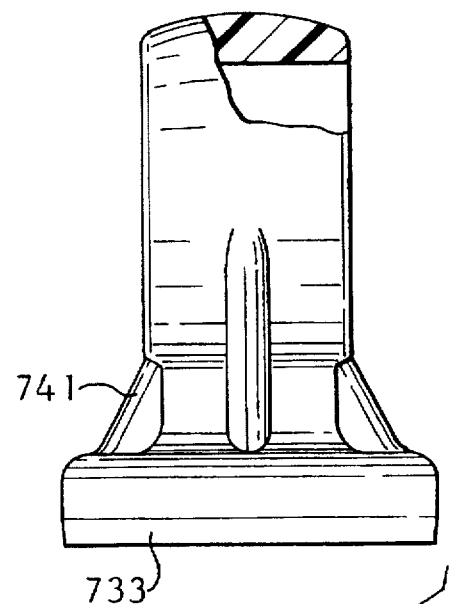
FIG. 3c
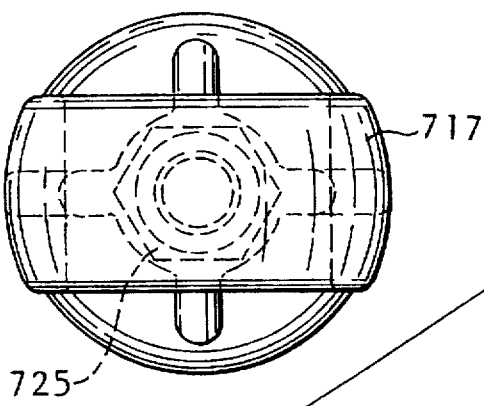
FIG. 3

5,730,262

SHOCK ABSORBER OR VIBRATION DAMPER AND A HINGE EYE FOR A VIBRATION DAMPER OR SHOCK ABSORBER

BACKGROUND OF THE INVENTION

1. Field of the Invention

The present invention generally relates to a hinge eye, in particular for a vibration damper, comprising a plastic body which has a transverse opening for a fastening means, and a connection opening for attachment to the unit to be held.

2. Background Information

A known hinge eye, such as that described hereinabove, is disclosed in U.S. Pat. No. 3,343,833. Unfortunately, a plastic hinge eye like the one disclosed in the above-referenced U.S. Patent, is essentially not usable because the hinge eye is not capable of transmitting required forces. This is a reason why plastic hinge eyes have not been used to any significant extent in vibration dampers.

OBJECT OF THE INVENTION

An object of the present invention is to realize a plastic hinge eye which can essentially guarantee the required minimum retention forces.

SUMMARY OF THE INVENTION

The present invention teaches that this object can be accomplished, in accordance with at least one preferred embodiment, by a hinge eye comprising a connection opening having a metal reinforcement sleeve to reinforce attachment.

As a result of the presence of the reinforcement sleeve, the required forces can essentially be reliably transmitted. Any added costs may be negligible and fully justified by the results achieved.

To prevent relative movements between the reinforcement sleeve and the hinge eye, the reinforcement sleeve can form an interlocking connection with the plastic body of the hinge eye by means of a portion of the outer cylindrical surface of the reinforcement sleeve. The outer cylindrical surface of the reinforcement sleeve can differ from an essentially uniform round shape. The present invention teaches that the different portion of the outer cylindrical surface can be realized in the form of a polygon, for example.

To axially secure the hinge eye, the portion of the outer cylindrical surface which differs from a round shape can be formed by at least one encircling collar. It has been determined that it can be particularly advantageous if an encircling collar is attached on each end of the reinforcement sleeve. The quality of the guidance provided by the reinforcement sleeve can be particularly good in this variant embodiment.

The present invention teaches that it can also be advantageous if the reinforcement sleeve can have a bottom on the end of the reinforcement sleeve facing the transverse opening. The bottom can make it easier to achieve a seal inside the injection mold, so that essentially no material can penetrate into the connection opening.

Additionally, the present invention teaches that because the plastic body can have a cover surface with a ring-shaped wall for fastening a protective tube, the hinge eye can be particularly well-suited for use in vibration dampers and gas shock absorbers in which the piston rods should be protected against dirt and dust. It is also possible that the cover surface can also be connected to the remainder of the plastic body by means of reinforcement ribs.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a shock absorber assembly comprising: a shock absorber, the shock absorber comprising: a sealed cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to divide the chamber into first and second chambers; means for permitting flow of damping fluid between the first and second chambers; a central longitudinal axis defined through the cylinder, the central longitudinal axis defining a longitudinal direction of the cylinder; a first end and a second end disposed substantially opposite one another along the longitudinal axis of the shock absorber; the first end comprising: means for connecting to a first element which first element is external to the shock absorber; the second end comprising: means for connecting to a second element which second element is external to the shock absorber; the means for connecting to a first element comprising a hinge eye; the hinge eye comprising at least one receiving opening for receiving, making contact with, and holding the first external element; the hinge eye comprising a sleeve made of metal, the metal sleeve being dimensioned and disposed to mechanically reinforce the hinge eye; the metal sleeve comprising a first portion of the hinge eye; the hinge eye comprising a second portion independent of the metal sleeve; the metal sleeve being intimately joined to the second portion of the hinge eye; the shock absorber comprising a substantial portion; and the metal sleeve comprising means for connecting the hinge eye to the substantial portion of the shock absorber.

Another aspect of the present invention resides broadly in a cylinder assembly containing a fluid, the cylinder assembly comprising: a cylinder defining a chamber therein, the cylinder containing a fluid; a piston rod sealingly projecting into the cylinder and being axially displaceable with respect to the cylinder; a piston being attached to the piston rod, the piston being slidably disposed within the cylinder to divide the chamber into first and second chambers; means for permitting flow of fluid between the first and second chambers; a central longitudinal axis defined through the cylinder, the central longitudinal axis defining a longitudinal direction of the cylinder; a first end and a second end disposed substantially opposite one another along the longitudinal axis of the cylinder; the first end comprising: means for connecting to a first element, which first element is external to the cylinder; the second end comprising: means for connecting to a second element, which second element is external to the cylinder; the means for connecting to a first element comprising a hinge eye; the hinge eye comprising at least one receiving opening for receiving, making contact with, and holding the first external element; the hinge eye comprising a sleeve made of metal, the metal sleeve being dimensioned and disposed to mechanically reinforce the hinge eye; the metal sleeve comprising a first portion of the hinge eye; the hinge eye comprising a second portion independent of the metal sleeve; the metal sleeve being intimately joined to the second portion of the hinge eye; the cylinder comprising a substantial portion; and the metal sleeve comprising means for connecting the hinge eye to the substantial portion of the cylinder.

BRIEF DESCRIPTION OF THE DRAWINGS

The present invention is explained in greater detail below, with reference to the embodiments illustrated in the accompanying drawings, in which:

FIGS. 2 and 3 show embodiments of the hinge eye;

DESCRIPTION OF THE PREFERRED EMBODIMENT

Figure 1:
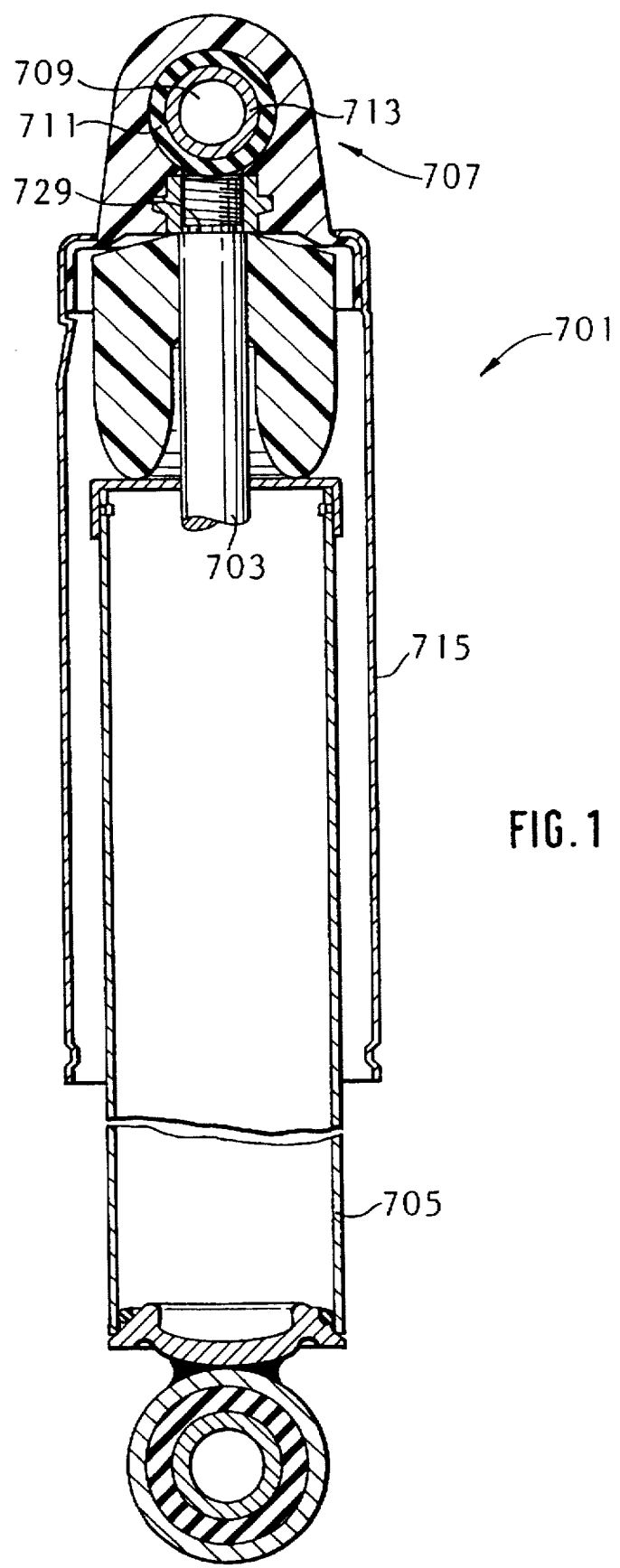
FIG. 1 shows a hinge eye on a vibration damper.

FIG. 1 shows a vibration damper 701, although the drawing does not show internal components. Of course, the present invention is not restricted exclusively to vibration dampers.

Figure 2:
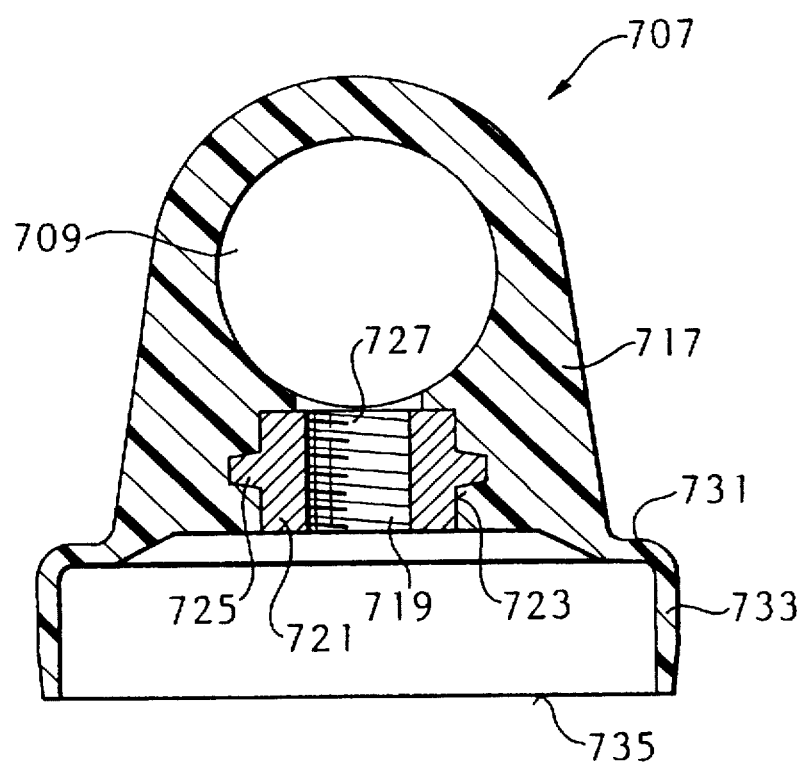

Inside the vibration damper 701, there can be a piston rod 703, the end of which can be outside a cylinder 705 and have a hinge eye 707. To fasten the hinge eye 707, the piston rod 703 can have a thread 727 (as shown in FIG. 2). Inside a transverse opening 709 of the hinge eye 707, a universally deformable rubber ring 711 can be inserted, in which a bushing 713 can be impressed. A protective tube 715 can preferably enclose the piston rod 703 and essentially prevent the penetration of dirt.

The universally deformable rubber ring 711 can be deformable in all directions and can have the capability of returning to an original shape. It may be necessary to deform the rubber ring 711 from a manufactured shape in order, for example, to insert the rubber ring 711 inside the transverse opening 709 of the hinge eye 707. The capability, then, of returning to an original manufactured shape can allow the universally deformable rubber ring 711 to return to a pre-insertion shape so that the rubber ring 711 can properly seat within the transverse opening 709.

FIG. 2 shows the hinge eye 707 in isolation. The hinge eye 707 can consist essentially of a plastic body 717 with the transverse opening 709 for fastening means. In the axial direction, there can be a connection opening 719, in which there can be a reinforcement sleeve 721. By means of a portion of the external cylindrical surface 723, that differs from a uniformly round shape, the reinforcement sleeve 721 can form an interlocking connection with the plastic body 717. It can be appropriate, for example, if the reinforcement sleeve 721 is fabricated from a polygonal profile, i.e. from a standardized and readily available part. It can thereby be possible to essentially prevent a relative rotational movement between the plastic body 717 and the reinforcement sleeve 721. An encircling collar 725 can essentially prevent a relative translation movement. A thread 727 which can match the thread in the piston rod 703 can be machined inside the reinforcement sleeve 721. When the hinge eye 707 would be installed, the reinforcement sleeve 721 could be supported on a shoulder 729 (see FIG. 1) of the piston rod 703.

The polygonal profile of the reinforcement sleeve 721 can be square, rectangular, pentagonal, hexagonal, etc. The profile used can essentially depend, among other things, on such matters as availability of standardized parts, manufacturing tools and procedures, assembly tools and procedures, and anticipated stresses on the reinforcement sleeve 721 when it is put into use.

For the protective tube 715 (shown in FIG. 1), the plastic body 717 can have a cover surface 731 with a ring-shaped wall 733. The protective tube 715 can be supported on the cover surface 731 and an end surface 735 of the ring wall 733.

When the hinge eye 707 is manufactured, the reinforcement sleeve 721 can be inserted into an injection mold, whereby the matching thread 727 can be sealed. The injected plastic comprises (i.e. envelops or encloses) the encircling collar 725 and the external cylindrical surface 723 of the reinforcement sleeve 721, whereby a non-rotational and non-detachable connection is formed which is capable of reliably transmitting the necessary retention forces.

FIG. 3 illustrates additional embodiments of FIG. 2, so that only the differences between the embodiments will be discussed below. A significant difference is that the reinforcement sleeve 721 can have the encircling collar 725 on the end, whereby the collar facing the transverse opening 709 is formed by a bottom 737 of the reinforcement sleeve 721. For the matching thread 727, the reinforcement sleeve 721 can have an undercut, or relief groove 739, which can simplify the manufacture of the matching thread.

Reinforcement ribs 741 can also be attached between the cover surface 731 and the rest of the plastic body 717. The plan view, FIG. 3c, shows the polygonal profile of the collar 725 of the reinforcement sleeve 721, like the one described above with reference to FIG. 2.

Figure 4:
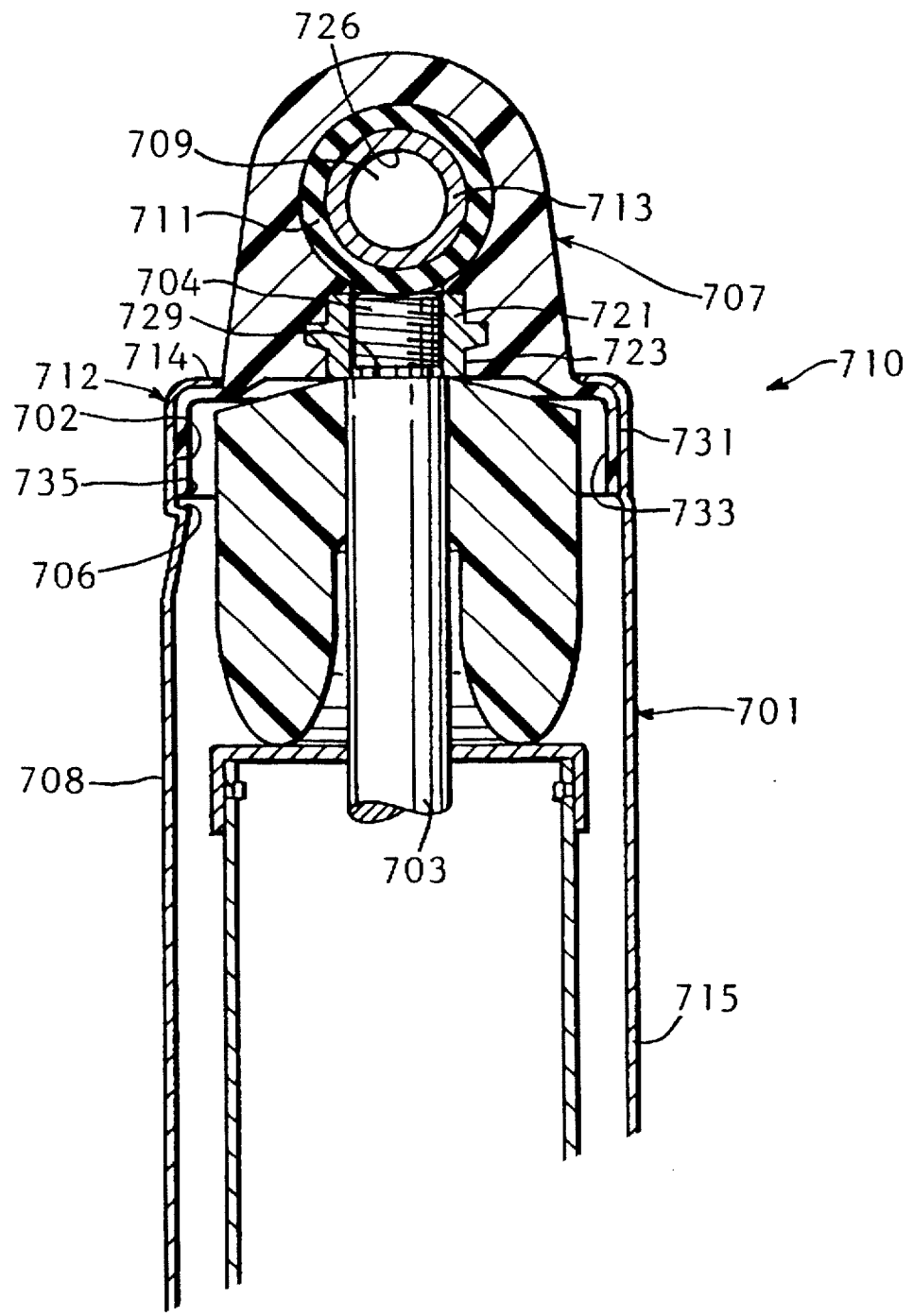
FIG. 4 is essentially the same as an upper portion of FIG. 1, but shows additional components.

In accordance with at least one embodiment of an invention, a hinge eye 707, as shown in FIG. 4, can be mounted inside an end 712 of a protective tube 715. The protective tube 715, in the end 712, can have a round-shaped opening with a lip 714. The lip 714 can preferably form the circumference of the round-shaped opening. In order to assemble the hinge eye 707 and the vibration damper 701 as a single working unit 710, hinge eye 707 can be inserted into the protective tube 715 until the cover surface 731 of the plastic body 717, in the vicinity of the ring-shaped wall 733, contacts the inner surface 702 of the end 712 of the protective tube 715. The threaded portion 704 of the piston rod 703 can then be screwed into the threads 727 of the connection opening 719.

In this embodiment, the protective tube 715 can have a main body portion 708 and an end portion 712. The demarcation of the main body portion 708 from the end portion 712 can be an inner shoulder 706. The inner shoulder 706 can preferably be formed circumferentially about the protective tube 715. The ring-shaped wall 733 can be seated within the end portion 712, and the end surface 735 of the ring-shaped wall 733 would be in contact with and supported by the inner shoulder 706 of the protective tube 715.

The working unit 710 can be completed by assembly of the vibration damper 701 with the hinge eye 707. The working unit 710 can be then put to use by connecting a shaft or pin to be held to the working unit 710 by means of the transverse opening 709. The transverse opening 709 can have a deformable rubber ring 711 and a bushing 713 within the deformable rubber ring 711. The deformable rubber ring 711 and the bushing 713 can essentially hinder transference of possible vibrations from a shaft or pin to be held to the working unit 710.

To avoid scarring and decrease friction, as necessary, between a held shaft or pin and the bushing 713, the bushing 713 can be made with a polymer, nylon, blend, or composite having an appropriately low coefficient of friction. The inner surface 726 of the bushing 713 can also have a low coefficient of friction coating.

To increase stability of the reinforcement sleeve 721 and the shoulder 729 of the reinforcement sleeve 721, the external cylindrical surface 723 can be provided with a material having a high coefficient of friction, possibly by coating. The reinforcement sleeve 721, then, could be more secure within the plastic body 717, and therefore less likely to move about within the plastic body 717.

Figure 5:
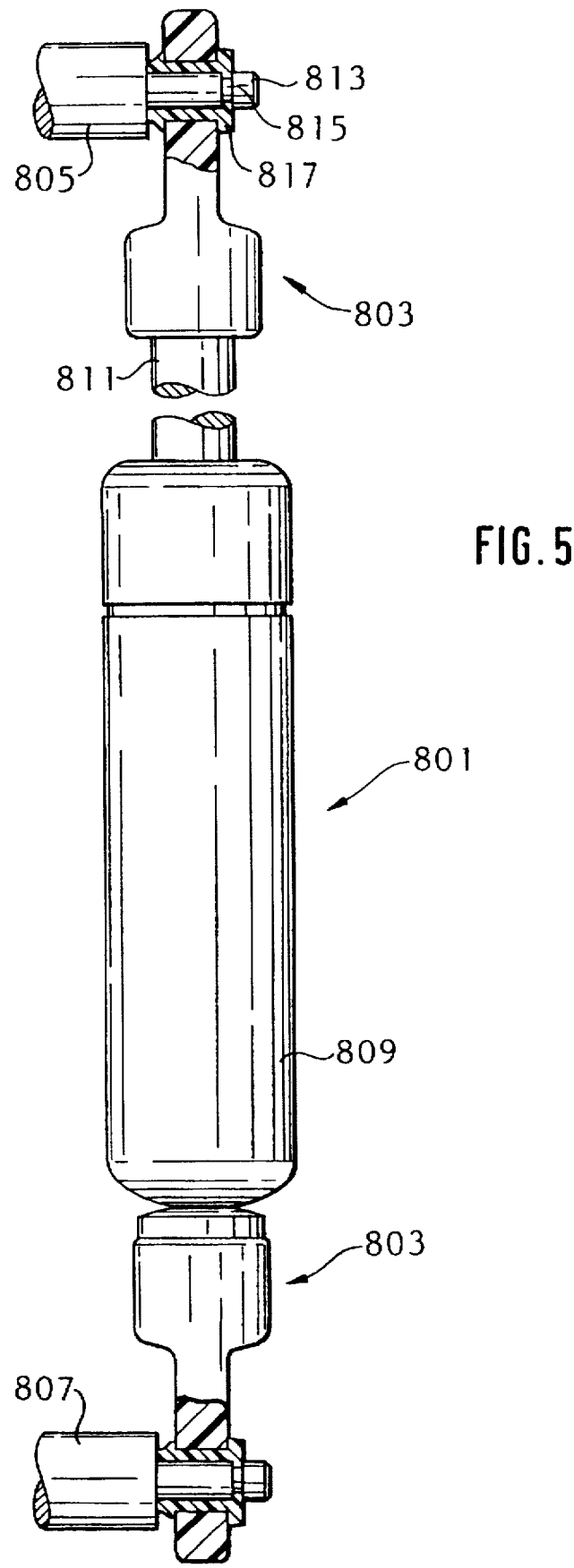
FIG. 5 shows a piston-cylinder unit in the form of an air spring with a hinge bracket on a shank.

The disclosure now turns to FIG. 5, wherein FIG. 5 shows a piston-cylinder unit 801 constructed in the form of an air spring which can be connected to a first base body 805 and a second base body 807 by means of hinge eyes 803. Sample applications include, for example, a vehicle hood or a spring which can make it easier to raise lids on furniture. The piston-cylinder unit 801 can include a cylinder 809, in which cylinder 809 a piston rod 811 can be guided so that it can move essentially axially. The cylinder 809 and the piston rod 811 can each have a hinge eye 803 which can be supported on a connection shank 813 of the individual base bodies 805, 807. The connection shank 813 can have a groove 815 in which the retaining tabs 817 of the hinge eye 803 are preferably engaged.

In accordance with at least one embodiment of the present invention, it can be possible that an embodiment of the present invention can be utilized with pumps of various types and kinds, and utilized with various other cylinder assemblies and structures.

One feature of the invention resides broadly in the hinge eye, in particular for a vibration damper, comprising a plastic body which has a transverse opening for a fastening means, and a connection opening for the attachment to the unit to be held, characterized by the fact that the connection opening 719 has a metal reinforcement sleeve 721 to reinforce the attachment.

Another feature of the invention resides broadly in the hinge eye characterized by the fact that the reinforcement sleeve 721 forms an interlocking or positive connection with the plastic body 717 by means of a portion of its external cylindrical surface 723 which differs from the uniformly round shape.

Yet another feature of the invention resides broadly in the hinge eye characterized by the fact that the different portion is realized in the form of a polygon.

Still another feature of the invention resides broadly in the hinge eye characterized by the fact that the different portion is formed by at least one encircling collar 725.

A further feature of the invention resides broadly in the hinge eye characterized by the fact that an encircling collar is attached to the reinforcement sleeve 721 on each end.

Another feature of the invention resides broadly in the hinge eye characterized by the fact that the reinforcement sleeve 721 has a base or bottom 737 on the end facing the transverse opening 709.

Yet another feature of the invention resides broadly in the hinge eye characterized by the fact that the plastic body 717 has a cover surface 731 with a ring-shaped wall 733 for fastening a protective tube 715.

Still another feature of the invention resides broadly in the hinge eye characterized by the fact that the cover surface 731 is also connected to the rest of the plastic body by means of reinforcement ribs or fins 41.

Some examples of piston-cylinder assemblies and various components associated therewith which could possibly utilize the present invention may be disclosed in the following U.S. Pat. Nos.: 4,155,144 to Koganei, entitled "Damper Device"; 4,653,735 to Buma, entitled "Suspension for Vehicle"; and 4,795,009 to Tanahashi and Hayashi, entitled "Twin-tube Type Shock Absorber".

Some examples of air spring assemblies and various components and applications associated therewith which could possibly utilize the present invention may be disclosed in the following U.S. Pat. Nos.: 4,741,517 issued May 3, 1988 to Warmuth, et al., entitled "Air Spring with Extensible Fabric Restraining Cylinder"; 4,709,896 issued Dec. 1, 1987 to Wahls and Gryp, entitled "In-seat Suspension"; 4,635,961 issued Jan. 13, 1987 to Lew, entitled "Air-spring Suspension"; and 5,454,455 issued Oct. 3, 1995 to Kundmuller and Christel, entitled "Cylinder Piston Device".

Some examples of piston-cylinder hinge eyes, joints, and various components associated therewith which may be utilized with the present invention may be found in the following U.S. Pat. Nos.: 4,326,733 to Rubalcava, entitled "Hydro-pneumatic Suspensions for Automotive Vehicles"; 5,338,055 to Mauz, entitled Independent Wheel Suspension"; 5,133,575 to Zantinge and Aalderink, entitled "Vehicle with Axle Suspension Device with Gas Spring Suspension and Control System Therefor"; 4,635,745 to Myers et al., entitled "Vehicle Air Suspension"; and 4,577, 840 to Meller et al., entitled "Self-pumping Hydropneumatic Spring Leg or Strut with Internal Level Control for Motor Vehicles".

Some examples of plastic materials which may be utilized with the present invention may be disclosed in the following U.S. Pat. Nos.: 4,659,766 issued Apr. 21, 1987 to Falk and Kliever, entitled "Graft Copolymer-plasticized PVC Blends as Thermoplastic Elastomers"; 4,957,962 issued Sep. 18, 1990 to Winkler et al., entitled "Fiber Composites"; and 5,004,784 issued Apr. 2, 1991 to Huynh-Ba, entitled "Polymer Blends Containing Isocyanate Reacting Agents".

Some examples of low coefficient of friction materials which may be utilized in accordance with at least one embodiment of the present invention may be disclosed in the following U.S. Pat. Nos.: 4,714,740 issued Dec. 22, 1987 to Lee and Golden, entitled "Low Coefficient of Friction Nylon Blend"; 4,654,235 issued Mar. 31, 1987 to Effenberger et al., entitled "Novel Wear Resistant Fluoropolymer-containing Flexible Composites and Method for Preparation Thereof"; and RE32514 (reissue of 4,473,676) issued Oct. 6, 1987 to Steklenski, entitled "Polymer Compositions Having a Low Coefficient of Friction".

Some examples of high coefficient of friction materials which may be utilized with the present invention may be disclosed in the following U.S. Pat. Nos.: 5,230,952 issued Jul. 27, 1993 to McCord, entitled "Sintered Composite Friction Material Comprising Fluorocarbon Resin"; 5,254, 391 issued Oct. 19, 1993 to Davis, entitled "Soft, Elastomeric, Polymer Coated Contact Surface"; 5,302,440 issued Apr. 12, 1994 to Davis, entitled "Polymer Coated Contact Surface"; 4,954,536 issued Sep. 4, 1990 to Komori et al. entitled "Brake-friction Material"; and 5,093,388 issued Mar. 28, 1992 to Siemon and Meier entitled "Very High Friction Elastomer Formulation for Use in Static Braking Applications".

Examples of adjustable vibration dampers and components thereof which could possibly be used in conjucntion with the embodiments of the present invention as set forth hereinabove can possibly be found in U.S. Pat. No. 5,375,683, entitled "Controllable Vibration Damper for Motor Vehicles;" U.S. Pat. No. 5,335,757, entitled "Hydraulic Adjustable Vibration Damper;" U.S. Pat. No. 5,251,730, entitled "Adjustable Vibration Damper;" U.S. Pat. No. 5,301,776, entitled "Hydraulic Adjustable Vibration Damper;" U.S. Pat. No. 5,265,703, entitled "Adjustable Hydraulic Vibration. Damper for Motor Vehicles;" U.S. Pat. No. 5,301,776, entitled "Hydraulic Adjustable Vibration Damper;" U.S. Pat. Nos. 5,350,187, entitled "Adjustable Damping System;" U.S. Pat. No. 4,986,363, entitled "Adjustable Vibration Dampers for Motor Vehicles;" U.S. Pat. No. 5,107,969, entitled "Controllable Vibration Damper; " U.S. Pat. No. 4,986,393, entitled "Adjustable Vibration Dampers for Motor Vehicles;" U.S. Pat. No. 4,973,854, enititled, "Hydraulic Shock-Absorber and Vibration Damper with Adjustable Damping;" and U.S. Pat. No. 5,143,185, entitled, "Controllable Hydraulic Vibration Damper for Automotive Vehicles."

Examples of vibration dampers with pistons having one or more piston valves connecting the working chambers, can possibly be found in U.S. Pat. No. 4,850,461, entitled "Shock Absorber Having a Throttle With a Variable Cross Section;" U.S. Pat. No. 5,207,300, entitled "Hydraulic, Adjustable Vibration Damper for Motor Vehicles;" U.S. Pat. No. 5,042,624, entitled "Hydraulic Shock Absorber with Pre-loaded Valve for Linear Variation Characteristics of Damping Force;" U.S. Pat. No. 5,072,812, entitled "Hydraulic Shock Absorber;" and U.S. Pat. No. 5,154,263, entitled "Method and Apparatus for Controlling the Flow of Damping Fluid Through a Piston."

Examples of injection molding, processes, and apparatuses which may be utilized in accordance with at least one embodiment of the present invention, may be disclosed in the following U.S. Pat. No. : 5,176,870 issued Jan. 5, 1993 to Mangone, entitled "Apparatus and Method for Molding Three Dimensional Articles"; 5,178,805 issued Jan. 12, 1993 to Yokota, entitled "Method of Controlling Injection Speed Selecting Points of Injection Molder"; 5,178,815 issued Jan. 12, 1993 to Yokote et al., entitled "Method of Forming Composite Moldings"; 5,178,888 issued Jan. 12, 1993 to Wurl, entitled "Device for Closing Molds of an Injection Molding Machine"; and 5,183,621 issued Feb. 2, 1993 to Yukihiro and Katagiri, entitled "Method of Both Single and Double Injection Molding".

Examples of O-rings as a sealing and/or guiding structure, and which may be utilized in accordance with at least one embodiment of the present invention, can possibly be found in U.S. Pat. No. 4,444,466, entitled "Universal Joint Seal and Vibration Damper for Remotely Actuated Pivotal Devices;" U.S. Pat. No. 4,372,624, entitled "Dynamic O-ring Seal;" U.S. Pat. No. 4,577,831, entitled Calibrated Handknob Assembly;" and U.S. Pat. No. 4,502,695, entitled "Mechanical Seal With Fluid Flow-Reversing Means."

Examples of other adjustment means or controls which may utilized in accordance with at least one embodiment of the present invention, can possibly be found in U.S. Pat. No. 5,350,187, entitled "Adjustable Damping System;"and U.S. Pat. No. 5,265,703, entitled "Adjustable Hydraulic Vibration Damper for Motor Vehicles;" U.S. Pat. No. 5,301,776, entitled "Hydraulic Adjustable Vibration Damper;" U.S. Pat. No. 4,989,148, entitled "Apparatus for the Computer Assisted Control of Vibration Dampers of A Vehicular Suspension System as a Function of the Roadway;" U.S. Pat. No. 4,850,460, entitled "Hydraulic Adjustable Shock Absorber;" U.S. Pat. No. 4,802,561, entitled "Adjustable Shock Absorber;" U.S. Pat. No. 4,723,640, entitled "Adjustable Hydraulic Vibration Damper;" U.S. Pat. No. 4,635,765, entitled "Adjustable Hydraulic Damper Apparatus;" U.S. Pat. No. 4,785,920, entitled "Hydraulic Adjustable Shock Absorber;" and U.S. Pat. No. 4,749,069, entitled "Vibration Damper for Motor Vehicles Having an Arrangement for Varying Damping Thereof."

Some examples of piston-cylinder hinge eyes, joints, and various components associated therewith which may be utilized with the present invention may be found in the following patent publications: Federal Republic of Germany Laid-Open Pat. Application No. DE-OS 43 39 448.5, filed Nov. 19, 1993.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 03 499.6, filed on Feb. 3, 1995, having inventors Sabine Rucks, Günther Braun, and Heinz Sydekum, and DE-OS 195 03 499.6 and DE-PS 195 03 499.6 are hereby incorporated by reference as if set forth in their entirety herein.

The foreign patent publication applications, namely, Federal Republic of Germany Patent Application No. P 44 45 233.0, filed on Dec. 17, 1994, having inventors Alfred K. Klein, Peter Thurmann, Horst Kaufmann, Jörg Gustke, and Horst Maury, and DE-OS P 44 45 233.0 and DE-PS P 44 45 233.0 are hereby incorporated by reference as if set forth in their entirety herein.

The foreign patent publication applications, namely, Federal Republic of Germany Patent Application No. P 44 43 109.0, filed on Dec. 3, 1994, having inventor Theo Rottenberger, and DE-OS P 44 43 109.0 and DE-PS P 44 43 109.0 are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber assembly comprising:
 a shock absorber, said shock absorber comprising:
  a sealed cylinder defining a chamber therein said cylinder containing a damping fluid;
  a piston rod sealing projecting into said cylinder and being axially displaceable with respect to said cylinder;

a piston being attached to said piston rod said piston being slidably disposed within said cylinder to divide said chamber into first and second chambers;

means for permitting flow of damping fluid between said first and second chambers; and a central longitudinal axis defined through said cylinder, the central longitudinal axis defining a longitudinal direction of said cylinder;

said shock absorber assembly further comprising:

a first end and a second end disposed substantially opposite one another along the longitudinal axis of said shock absorber;

said first end comprising:

means for connecting to a first element, which first element is external to said shock absorber;

said second end comprising:

means for connecting to a second element which second element is external to said shock absorber;

said means for connecting to a first element comprising a hinge eye;

said hinge eye comprising at least one receiving opening for receiving, making contact with, and holding said first external element;

said hinge eye comprising a sleeve made of metal, said metal sleeve being dimensioned and disposed to mechanically reinforce said hinge eye;

said metal sleeve comprising a first portion of said hinge eye;

said hinge eye comprising a second portion independent of said metal sleeve;

said second portion of said hinge eye comprising a plastic material;

said metal sleeve being intimately joined to said second portion of said hinge eye;

said shock absorber comprising a substantial portion;

said metal sleeve comprising means for connecting said hinge eye to said substantial portion of said shock absorber;

said metal sleeve being disposed to reinforce said second portion of said hinge eye;

said receiving opening having a central longitudinal axis;

the central longitudinal axis of said receiving opening being substantially perpendicular to the longitudinal axis of said hinge eye;

said metal sleeve having a central longitudinal axis;

said metal sleeve being substantially cylindrical in shape;

said metal sleeve having a first end and a second end disposed substantially opposite one another along the central longitudinal axis of said metal sleeve;

said means for connecting to a first element comprising an orifice in said metal sleeve;

said orifice of said metal sleeve having a central longitudinal axis;

the central longitudinal axis of said orifice being oriented substantially parallel to the central longitudinal axis of said metal sleeve;

said substantial portion of said shock absorber comprising said piston rod;

said orifice of said metal sleeve having an inner surface facing towards the central longitudinal axis of said metal sleeve;

said inner surface of said orifice of said metal sleeve being for receiving and being connected to said piston rod;

said metal sleeve comprising means for forming an interlocking connection with said second portion;

said metal sleeve having an outer surface facing away from the central longitudinal axis of said metal sleeve;

said outer surface of said metal sleeve having a cross-sectional shape;

said cross-sectional shape being a cylindrical shape;

said metal sleeve comprising at least one collar disposed about said outer surface of said metal sleeve;

said means for forming an interlocking connection comprising said at least one collar;

said at least one collar having a substantially polygonal shape;

said at least one collar having end portions; and said end portions being oriented substantially perpendicular to the central longitudinal axis of said metal sleeve.

2. The shock absorber assembly according to claim 1, wherein:

said at least one collar comprises at least one first collar and at least one second collar;

said at least one first collar is disposed substantially adjacent said first end of said metal sleeve; and said at least one second collar is disposed substantially adjacent said second end of said metal sleeve.

3. The shock absorber assembly according to claim 2, wherein:

said hinge eye has a longitudinal axis substantially coaxial with the central longitudinal axis of said vibration damper;

said hinge eye comprises at least one additional opening;

said at least one additional opening having a central longitudinal axis coaxial with the longitudinal axis of said hinge eye;

the central longitudinal axis of said metal sleeve is substantially parallel to the longitudinal axis of said hinge eye; and said metal sleeve is disposed within said at least one additional opening of said hinge eye.

4. The shock absorber assembly according to claim 3, wherein:

said first end of said metal sleeve is disposed towards said receiving opening;

said second end of said metal sleeve is disposed away from said receiving opening;

said first end of said metal sleeve comprises a base portion;

a major portion of said metal sleeve has a first diametrical dimension;

said base portion has a second diametrical dimension; and said first diametrical dimension is greater than said second diametrical dimension.

5. The shock absorber assembly according to claim 4 wherein:

said second portion comprises an outer surface;

said outer surface of said second portion comprises a cover surface for covering said second portion of said hinge eye;

said cover surface comprises fastening means;

said fastening means comprising means for receiving and fastening a protective tube to said hinge eye;

said fastening means comprises a ring-shaped wall;

said ring-shaped wall being substantially cylindrical in shape;

said ring-shaped wall has a central longitudinal axis;

the central longitudinal axis of said ring-shaped wall being substantially coaxial with the longitudinal axis of said hinge eye; and said ring-shaped wall is disposed substantially adjacent said first portion of said hinge eye.

6. The shock absorber assembly according to claim 5, wherein:

said hinge eye comprises at least one reinforcement rib;

said at least one reinforcement rib is disposed radially about said hinge eye with respect to the longitudinal axis of said hinge eye;

said at least one reinforcement rib has a longitudinal axis;

the longitudinal axis of said at least one reinforcement rib being substantially parallel to the central longitudinal axis of said hinge eye;

said at least one reinforcement rib comprises a first end and a second end;

said first end of said at least one reinforcement rib is connected to said second portion of said hinge eye;

said second end of said at least one reinforcement rib is connected to said cover surface;

said at least one first collar and said at least one second collar are configured for providing translational interlocking between said metal sleeve and said second portion of said hinge eye;

said substantially polygonal cross-section shape of said collar is configured for providing rotational interlocking between said metal sleeve and said second portion of said hinge eye; and said inner surface of said orifice of said metal sleeve comprises threads for connecting to said piston rod.

7. The shock absorber assembly according to claim 1, wherein:

said hinge eye has a longitudinal axis substantially coaxial with the central longitudinal axis of said vibration damper;

said hinge eye comprises at least one additional opening;

said at least one additional opening having a central longitudinal axis coaxial with the longitudinal axis of said hinge eye;

the central longitudinal axis of said metal sleeve is substantially parallel to the longitudinal axis of said hinge eye; and said metal sleeve is disposed within said at least one additional opening of said hinge eye.

8. The shock absorber assembly according to claim 7, wherein:

said first end of said metal sleeve is disposed towards said receiving opening;

said second end of said metal sleeve is disposed away from said receiving opening;

said first end of said metal sleeve comprises a base portion;

a major portion of said metal sleeve has a first diametrical dimension;

said base portion has a second diametrical dimension; and said first diametrical dimension is greater than said second diametrical dimension.

9. The shock absorber assembly according to claim 8, wherein:

said second portion of said hinge eye comprises a plastic material;

said second portion comprises an outer surface;

said outer surface of said second portion comprises a cover surface for covering said second portion of said hinge eye;

said cover surface comprises fastening means;

said fastening means comprising means for receiving and fastening a protective tube to said hinge eye;

said fastening means comprises a ring-shaped wall;

said ring-shaped wall being substantially cylindrical in shape;

said ring-shaped wall has a central longitudinal axis;

the central longitudinal axis of said ring-shaped wall being substantially coaxial with the longitudinal axis of said hinge eye; and said ring-shaped wall is disposed substantially adjacent said first portion of said hinge eye.

10. The shock absorber assembly according to claim 9, wherein:

said hinge eye comprises at least one reinforcement rib;

said at least one reinforcement rib is disposed radially about said hinge eye with respect to the longitudinal axis of said hinge eye;

said at least one reinforcement rib has a longitudinal axis;

the longitudinal axis of said at least one reinforcement rib being substantially parallel to the central longitudinal axis of said hinge eye;

said at least one reinforcement rib comprises a first end and a second end;

said first end of said at least one reinforcement rib is connected to said second portion of said hinge eye;

said second end of said at least one reinforcement rib is connected to said cover surface;

said at least one first collar and said at least one second collar are configured for providing translational interlocking between said metal sleeve and said second portion of said hinge eye;

said substantially polygonal cross-section shape of said collar is configured for providing rotational interlocking between said metal sleeve and said second portion of said hinge eye; and said inner surface of said orifice of said metal sleeve comprises threads for connecting to said piston rod.

* * * * *

UNITED STATES PATENT AND TRADEMARK OFFICE
CERTIFICATE OF CORRECTION

PATENT NO. : 5,730,262
DATED : March 24, 1998
INVENTOR(S) : Sabine LACK, Günther BRAUN and Heinz SYDEKUM It is certified that error appears in the above-identified patent and that said Letters Patent is hereby corrected as shown below:

```
     In column 7, line 9, after 'Pat.', delete "Nos."
and insert --No.--.
```

Signed and Sealed this

Eleventh Day of August 1998

Attest:

BRUCE LEHMAN

Attesting Officer

Commissioner of Patents and Trademarks